(12) United States Patent
Bahl et al.

(10) Patent No.: US 9,594,267 B2
(45) Date of Patent: Mar. 14, 2017

(54) SYSTEM AND METHOD FOR BRILLOUIN SCATTERING INDUCED TRANSPARENCY

(71) Applicant: The Board of Trustees of the University of Illinois, Urbana, IL (US)

(72) Inventors: Gaurav Bahl, Champaign, IL (US); JunHwan Kim, Savoy, IL (US); Hailin Wang, Eugene, OR (US); Mark Kuzyk, Eugene, OR (US)

(73) Assignees: THE BOARD OF TRUSTEES OF THE UNIVERSITY OF ILLINOIS, Urbana, IL (US); THE UNIVERSITY OF OREGON, Eugene, OR (US)

( * ) Notice: Subject to any disclaimer, the term of this patent is extended or adjusted under 35 U.S.C. 154(b) by 0 days.

(21) Appl. No.: 14/872,321

(22) Filed: Oct. 1, 2015

(65) Prior Publication Data
US 2016/0109736 A1  Apr. 21, 2016

Related U.S. Application Data

(60) Provisional application No. 62/064,648, filed on Oct. 16, 2014.

(51) Int. Cl.
| | |
|---|---|
| *G02F 1/01* | (2006.01) |
| *G02F 1/125* | (2006.01) |
| *G02B 6/293* | (2006.01) |
| *G02B 6/28* | (2006.01) |

(52) U.S. Cl.
CPC ........... *G02F 1/125* (2013.01); *G02B 6/2934* (2013.01); *G02B 6/29341* (2013.01); *G02B 6/2843* (2013.01)

(58) Field of Classification Search
CPC .................... G02B 6/2934; G02B 6/29341
See application file for complete search history.

(56) References Cited

U.S. PATENT DOCUMENTS

| | | | |
|---|---|---|---|
| 6,850,712 B1 | 2/2005 | Delavaux | |
| 8,508,843 B2 | 8/2013 | Murison | |
| 2005/0129362 A1 | 6/2005 | Agrawal | |
| 2016/0109736 A1* | 4/2016 | Bahl | G02F 1/125 |
| | | | 385/1 |

OTHER PUBLICATIONS

Dong, Chunhua. "Dynamic behavior of optomechanical induced transparency in a silica microresonator." 2014 16th International Conference on Transparent Optical Networks (ICTON), ISSN: 2162-7339, pp. 1-5, Jul. 6-10, 2014.*
Dong, Chunhua. "Non-reciprocal light storage in a silica microsphere." 2015 Conference on Lasers and Electro-Optics (CLEO), ISSN: 2160-8989, pp. 1-2, May 10-15, 2015.*

(Continued)

*Primary Examiner* — Rhonda Peace
(74) *Attorney, Agent, or Firm* — Klintworth & Rozenblat IP LLC

(57) ABSTRACT

A system and method includes a laser to create a control laser signal and a laser to create a probe laser signal. A resonator creates an acoustic signal adjacent the control laser signal and the probe laser signal. A resulting coherent interaction between the control laser signal and the probe laser signal creates a Brillouin scattering induced transparency in one direction and maintains opacity in an opposite direction.

20 Claims, 11 Drawing Sheets

(56) References Cited

OTHER PUBLICATIONS

Kim, JunHwan et. al. "Observation of Brillouin scattering induced transparency in a silica microsphere resonator." 2014 Conference on Lasers and Electro-Optics (CLEO)—Laser Science to Photonic Applications, ISSN: 2160-8989, pp. 1-2, Jun. 8-13, 2014.*

Thevenaz, Luc et. al. "Zero-Gain Slow Light in Optical Fibers." 2006 European Conference on Optical Communications, ISSN: 1550-381X, pp. 1-2, Sep. 24-28, 2006.*

Shen, et al. "Experimental Realization of Optomechanically Induced Non-Reciprocity," Nature Photonics, vol. 10, 2016, pp. 657-662.

* cited by examiner

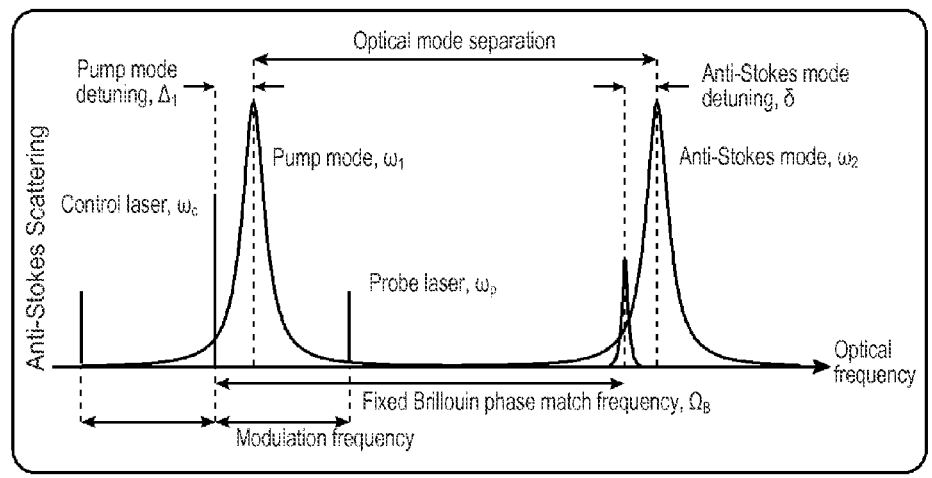
Figure 8
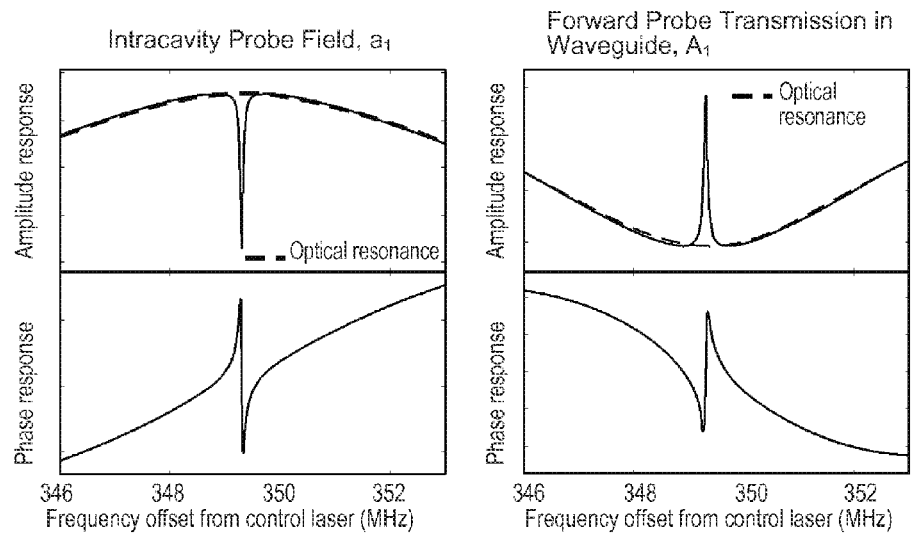
Figure 9A                    Figure 9B

SYSTEM AND METHOD FOR BRILLOUIN SCATTERING INDUCED TRANSPARENCY

CROSS-REFERENCE TO RELATED APPLICATION

This application claims the benefit of U.S. Provisional Application Ser. No. 62/064,648, filed Oct. 16, 2014, which is incorporated in its entirety herein.

GOVERNMENT LICENSE RIGHTS

This invention was made with government support under grant numbers 1205544 and 1408539 awarded by the National Science Foundation, and under grant number FA9550-14-1-0217 awarded by the Air Force Office of Scientific Research. The government has certain rights in the invention.

BACKGROUND

Electro-magnetically induced transparency (EIT) provides a mechanism for controlling bi-directional light propagation in a dielectric medium. EIT traditionally typically arises from destructive interference induced by a non-radiative coherence in an atomic system. EIT-type processes based on SBS include a magneto-optical element, e.g., electromagnetic power and/or magnets, and have been considered infeasible because of the short coherence lifetime of hypersonic phonons.

BRIEF DESCRIPTION OF THE DRAWINGS

In association with the following detailed description, reference is made to the accompanying drawings, where like numerals in different figures can refer to the same element.

FIG. 8 includes a graph of an optical frequency relationship of the coupled triplet system for transparency experiment using anti-Stokes scattering.

FIGS. 9A-B include graphs of theoretical prediction of amplitude and phase responses for induced transparency.

DETAILED DESCRIPTION

The following systems and methods describe a Brillouin scattering induced transparency (BSIT) generated by acousto-optic interaction of light with long-lived propagating phonons. The term transparency includes transparent for a narrow range of wavelength, e.g., a determined frequency of light. The transparency is non-reciprocal due to phase-matching requirements governing the physics of the process. BSIT is demonstrated in a silica micro-resonator having a determined, naturally occurring, forward-SBS phase-matched modal configuration. Stimulated Brillouin scattering (SBS) of light from propagating hypersonic acoustic waves can be used for the generation of slow and fast light. BSIT is shown to enable extremely compact and ultralow power slow/fast light generation with delay-bandwidth product comparable to current SBS systems.

SBS is a material-level nonlinearity occurring in all states of matter in which two optical fields are coupled to a traveling acoustic wave through photoelastic scattering and electrostriction. The light fields scatter from the periodic photoelastic perturbation generated by the traveling acoustic wave, while simultaneously writing a spatiotemporally beating electrostriction force whose momentum and frequency matches the acoustic wave. Phase matching for SBS can therefore be determined by both energy and momentum conservation, and is satisfied in back-scattering only by multi-GHz phonon modes in most solids. SBS can be used for optical gain, laser linewidth narrowing, optical phase conjugation, dynamic gratings, and material characterization and microscopy, etc. The applications of SBS in superluminal- and slow-light generation can be recognized as well. However, unlike the case of EIT, the generation of transparency with SBS has never been demonstrated. This is because in typical Brillouin scattering pump-probe systems the lifetimes of phonons at multi-GHz frequencies are much shorter than the photon lifetimes, effectively disabling the coherent interference of probe Stokes scattering and pump anti-Stokes scattering pathways. In a forward-scattering SBS system however, this lifetime relationship can be reversed by coupling the light fields through a low-frequency long-lived phonon mode, e.g., modes previously seen in forward-SBS lasing and Brillouin cooling, as described in more detail below.

Figure 1A:
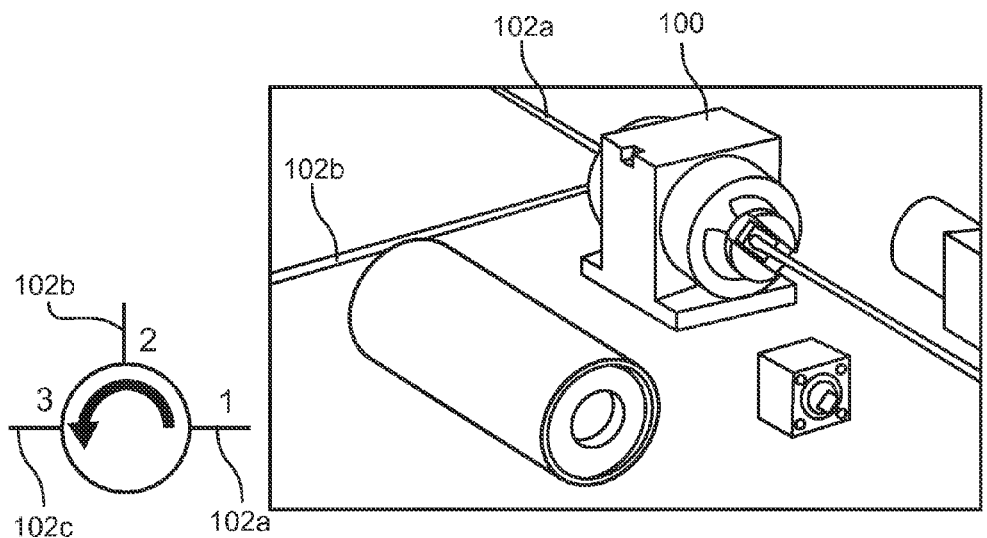
FIG. 1A is a diagram of an example circulator.
Figure 1B:
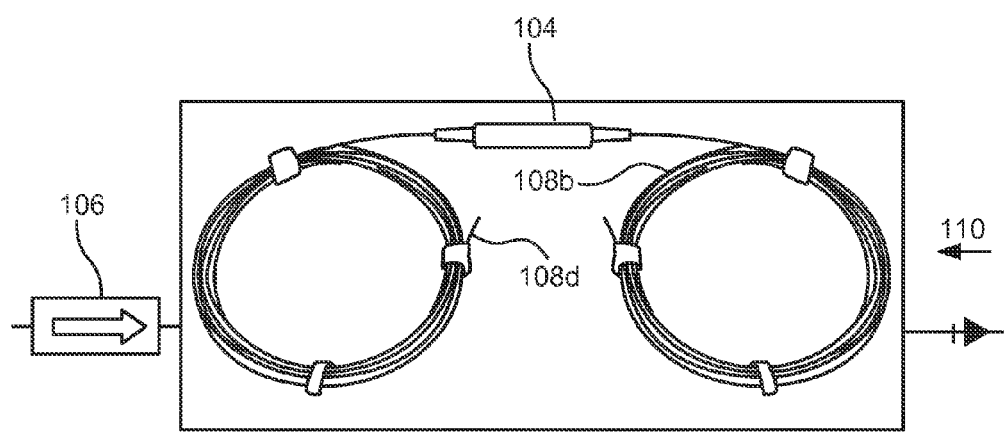
FIG. 1B is a diagram of an example isolator, both of which can be examples of implementations for the Brillouin scattering induced transparency (BSIT).

FIG. 1A is a diagram of an example optical circulator 100, and FIG. 1B is a diagram of an example optical isolator 104, both of which can be examples of implementations for the Brillouin scattering induced transparency (BSIT). The optical circulator 100 allows light entering any port 102a, b, c to exit from the next port 102a, b, c. The optical isolator 104 is diode-like to allow light transmission one-way in a determined direction 106, e.g., from one end 108a of a fiber optic cable to another end 108b, and maintains opacity in the other direction 110. Other implementations include optical switches, optical communication waveguides, etc. Additional or alternative to light, the Brillouin scattering can be used for other electromagnetic waves such as radiofrequency waves, microwaves, and even other forms of waves that interact with sound, etc.

Optics' systems occasionally need non-reciprocal properties, which can only happen when the symmetry of the system is broken. Currently, this effect is almost exclusively achieved through magneto-optical phenomena by applying an external magnetic field. The required large magnetic bias can render the current approach incompatible with on-chip application. The BSIT described in the following can provide non-reciprocal properties without the need for magnets or electromagnets, etc.

Figure 2A:
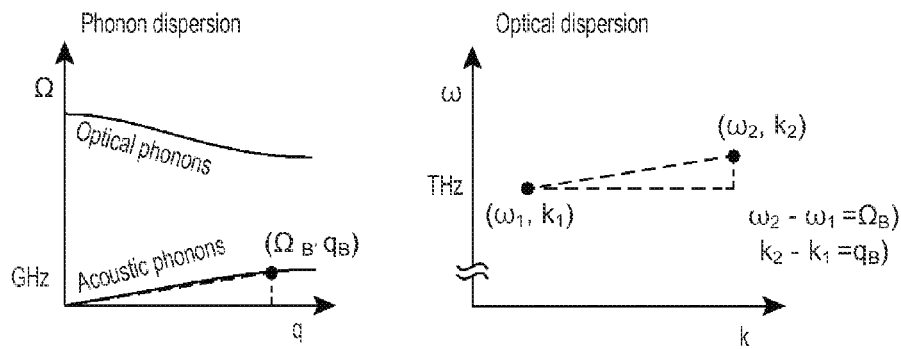
FIGS. 2A-C include graphs for an example BSIT.
Figure 2B:
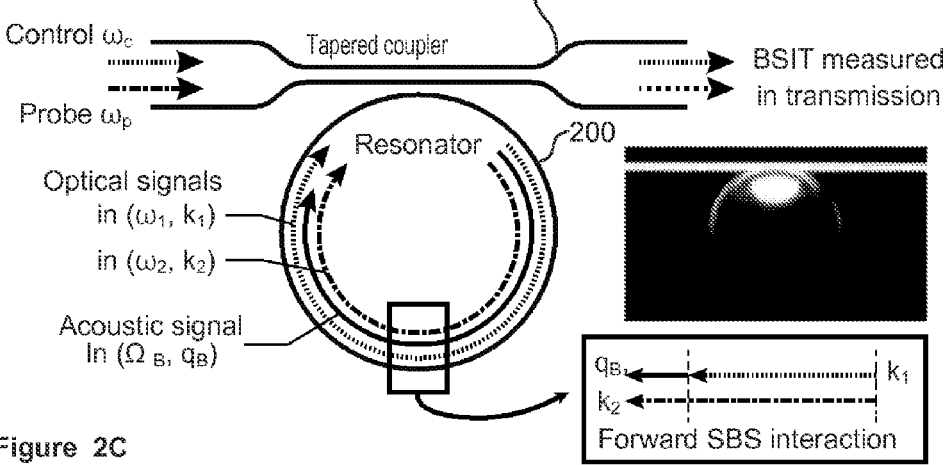
Figure 2C:
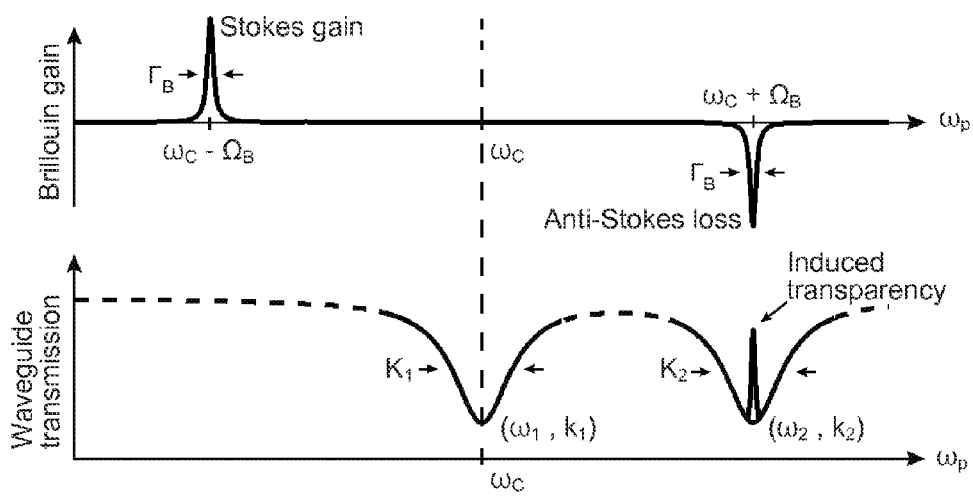

FIGS. 2A-C include graphs for an example BSIT implementation. BSIT based devices, e.g., switches, isolators, circulators, etc., can be used for mobile devices, e.g., cell phones, for radars, routers, cold-atom devices, signal processing devices, sensors, etc., and other implementations where optics is used. The BSIT devices can work in different mediums, including glass, gas, etc. FIG. 2A illustrates Brillouin phase matching including two optical modes of a system that are separated by the acoustic parameters in ω-k space. The BSIT induced transparency phenomenon can be caused by the interaction between the two optic waves, e.g., control laser $\omega_c$ and probe laser $\omega_p$, and one acoustic wave, e.g., acoustic signal. The direction of the acoustic wave or the control laser determines a direction of the transparency.

In FIG. 2B, control laser signal $\omega_c$ and probe laser signal $\omega_p$ are coupled to two distinct optical modes, e.g., whispering gallery modes, of a resonator 200 that are phase-matched for the SBS interaction by way of a tapered optical fiber 202. The geometry of the resonator 200 determines the energy and momentum condition for phase matching between the control laser signal $\omega_c$ and probe laser signal $\omega_p$. A race track resonator can be used in place of the whispering gallery resonator, etc., or other resonator 200 that produces a sound wave in a determined direction. The control laser signal $\omega_c$ and probe laser signal $\omega_p$ generate optical forces (electrostriction pressure, radiation pressure) within the resonator 200 that create an acoustic wave at the difference frequency $\omega_c-\omega_p$. The acoustic wave exists at a frequency-difference and momentum difference between the control laser signal and the probe laser signal. A forward-SBS opto-acoustic interaction can then take place between these three modes within the resonator 200. Selection of the frequency of control laser $\omega_c$ and a geometry of resonator 200, permits transmission of probe laser $\omega_p$. In the reverse direction, light at the probe laser frequency $\omega_p$ is not permitted through and is instead absorbed by the resonator. A geometric shape of the resonator 200 provides a structure that can be changed in various ways to achieve a desired phase-matching, for example including a height, a thickness, a thinness, a circumference, etc. If the resonator 200 is solid, example geometries for the resonator 200 include a spheroid, a disk, a ring, a shell, a toroid, a balloon, a non-defined shape, etc.

In FIG. 2C, the control laser pumps the lower frequency optical mode to allow anti-Stokes scattering while the resonator suppresses Stokes scattering. In the bottom part of FIG. 2C, a probe laser scans through the optical resonances, visible as a drop in waveguide transmission. In the top part of FIG. 2C, from traditional SBS theory anti-Stokes absorption is predicted for a probe signal at $\omega_p=\omega_c+\Omega_B$, which intuitively increases the probe loss. However, when $(\Omega_B,q_B)$ represent a long lived phonon mode, a transparency is observed due to interference between Stokes and anti-Stokes scattering pathways. The component $\kappa_i$ represents the respective dissipation rates of the two optical modes. Therefore, the anti-Stokes loss plus resonator loss induces transparency (loss+loss=gain). The induced transparency has a non-reciprocal property, and does not require an external magnetic field.

Nonlinear optical processes such as EIT satisfy the energy-momentum conservation, leading to the phase-matching requirement. For EIT in an atomic system, the momentum of the spin wave is set by the relevant optical waves, automatically satisfying the phase matching requirement. In comparison, the traveling acoustic wave in Brillouin scattering induced transparency (BSIT) carries a momentum that is intrinsic to the mechanical medium, is discretized by the resonator, and can far exceed the momentum of an optical wave, which leads to special phase matching requirement as discussed in detail below. This property makes BSIT intrinsically non-reciprocal. The BSIT vanishes when either the probe or the control reverses its propagation direction (see, e.g., FIG. 5). Such non-reciprocity based BSIT can be implemented in various applications, including optical switching, on-chip optical isolators, circulators, and gyroscopes, etc. The non-reciprocity based BSIT can reduce the size and cost of current optical isolators, circulators, etc., and/or enable magnetic-free on-chip application.

The generation of BSIT includes a 3-mode system having two optical modes and one long-lived acoustic mode. Phase-matching of these modes in both frequency space and momentum space is utilized as illustrated in FIG. 2A. The momentum requirement is not needed for other transparency mechanisms. In BSIT, the energies and momenta of these three modes are matched to satisfy $\omega_2-\omega_1=\Omega_B$ and $k_2-k_1=q_B$ simultaneously. Here, $(\omega_1,k_1)$ are the energy and momentum of the lower energy optical mode, $(\omega_2,k_2)$ represent the higher energy optical mode, and $(\Omega_B,q_B)$ represent the acoustic mode (FIG. 2A and FIG. 2B). The coupling between the three modes is mediated by electrostrictive Brillouin scattering.

Figure 3A:
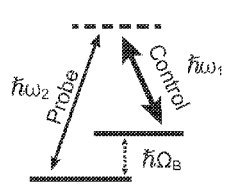
FIGS. 3A-F include graphs for observation of BSIT and slow light.
Figure 3B:
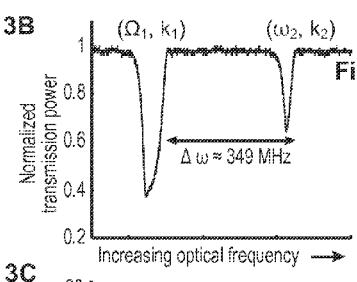
Figure 3C:
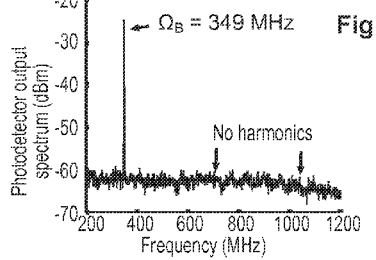
Figure 3D:
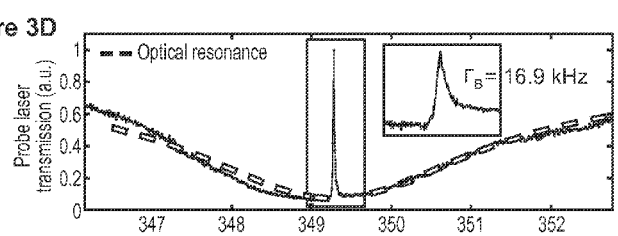
Figure 3E:
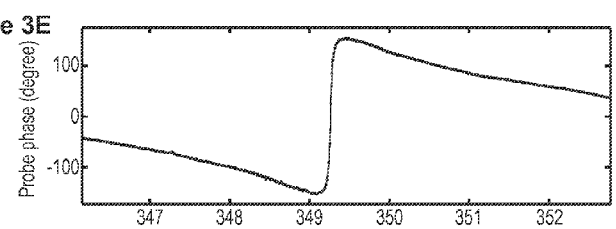
Figure 3F:
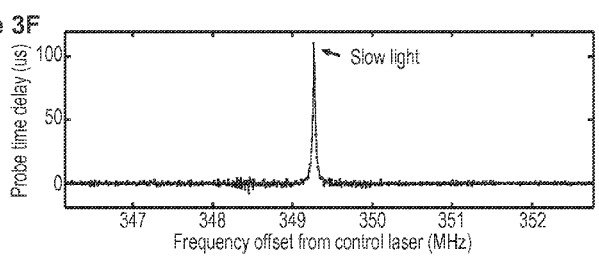

FIGS. 3A-F include graphs for observation of BSIT and slow light, e.g., slow propagation of information pulse. Slow light can be used to buffer information for processing, etc. FIG. 3A is a Brillouin scattering analogue of EIT's 3-level lambda system. FIG. 3B show the phase-matched resonator optical modes measured with a swept frequency laser. In FIG. 3C, when pumping the $(\omega_2,k_2)$ mode with a strong laser source, a Stokes SBS laser is generated. When the Stokes scattered and pump light are interfered on a photodetector, a beat note corresponding to their frequency difference, $\Omega_B$, is measured. The lack of harmonics of $\Omega_B$ indicates that this is not a radiation pressure induced optomechanical oscillation. In FIG. 3D, transparency is observed for a probe on $(\omega_2,k_2)$ when a strong pump is placed at $(\omega_1,k_1)$. The solid line is the probe laser amplitude response. The dashed-line is the curve fit to the $(\omega_2,k_2)$ optical mode. In FIG. 3E the probe phase response indicates slow light response within the transparency. In FIG. 3F, additional probe group delay $\Delta t=d\phi/d\omega$ is compared to the transmission time without BSIT. One (1) mW of laser power is used to generate time delay of 110 μs.

Both forward-SBS and backward-SBS phase matching can occur naturally within a microresonator. When momentum matching is assumed, a 3-level lambda system analogy to EIT can also be made in the case of BSIT (FIG. 3A). The system is excited through the addition of a photon at either $(\omega_1,k_1)$ or $(\omega_2,k_2)$ to a virtual level. The system then radiatively decays to one of the lower levels with the emission of a Stokes or anti-Stokes photon, along with the creation or annihilation of a phonon. The two available scattering pathways create an interference analogous to the interference of transition pathways from electromagnetically induced transparency. This additional conservation of momentum requirement breaks the reciprocity of this system with respect to the optical probe signal.

Note that processes analogous to EIT have also been demonstrated recently in optomechanical systems, in which the optical waves couple to the mechanical motion via radiation pressure. This optomechanically-induced transparency (OMIT) takes place via stationary breathing vibrational modes, instead of a traveling acoustic wave mode. As such, OMIT lacks the special phase matching and non-reciprocity characteristic of BSIT.

Consider the situation where a strong laser pumps the lower energy optical mode ($\omega_1, k_1$) while a weaker tunable probe beam measures the higher energy optical mode ($\omega_2, k_2$) of the coupled system (FIG. 3A). When the anti-Stokes probe signal is tuned to a resonator mode, it couples strongly to the resonator and generates a well understood opacity in the waveguide (FIG. 2C, bottom). Further, in the presence of Brillouin phase match with a strong Stokes frequency signal (the control laser) and a long lived phonon mode in the same medium, the anti-Stokes probe is expected to undergo very strong resonant absorption into the Stokes signal (FIG. 2C, top). Intuitively, these two cascaded stages of absorption can lead to near-complete removal of the probe light from the system. As illustrated by the system, this intuition breaks down, and instead of strong absorption of the anti-Stokes probe, an interference is generated between the Stokes-directed absorption and anti-Stokes-directed scattering pathways. This interference of the two scattering pathways is analogous to the interference of the two optical transitions in EIT. This results in a previously unforseen Brillouin scattering induced transparency at the probe frequency $\omega_p = \omega_c + \Omega_B$ and the probe no longer couples into the resonator optical mode (FIG. 2C).

In addition to the above intuitive explanation, the existence of this transparency can be derived through the mutually coupled electromagnetic and acoustic wave equations, described below. The formalism for triply-resonant Brillouin scattering developed by Agarwal and Jha (Physical Review A, vol. 88, p. 013815, July 2013), which is incorporated by reference herein, can be adapted in reference to describe the resonator system. A result is that the probe field transfer function $a_2/f_p$ in this system is provided by the equations:

$$\frac{a_2}{f_p} = \frac{\Gamma_B + i\Delta_B}{(\kappa + i\Delta_2)(\Gamma_B + i\Delta_B) + |\beta|^2 |a_1|^2} \quad (1)$$

$$\Delta_B = \Omega_B - (\omega_p - \omega_c) \quad (2)$$

$$\Delta_2 = \omega_2 - \omega_p \quad (3)$$

where $a_1$ and $a_2$ are intracavity control and probe light fields respectively, $f_p$ is the source field associated with the coupled probe laser, $\kappa$ is optical loss rate, $\Gamma_B$ is acoustic loss rate, $\beta$ is coupling coefficient accounting for modal overlap and Brillouin gain in the material, $\Delta_B$ and $\Delta_2$ are detuning parameters, $\Omega_B$ is Brillouin acoustic mode frequency, $\omega_2$ is the anti-Stokes optical mode center frequency, and $\omega_p$ and $\omega_c$ are probe and control laser frequencies respectively. Assume that $\kappa_1 = \kappa_2 = \kappa$ for mathematical convenience although the optical loss rates are not necessarily identical. Here, it can be seen that the acoustic loss rate $\Gamma_B$ are lower than the optical loss rate $\kappa$ in order to observe transparency. In the opposite case where $\kappa = \Gamma_B$ as in most SBS experiments, the coupling rate $|\beta|^2 |a_1|^2$ in equation 1 becomes negligible and no transparency is generated.

An example experimental setup includes an ultra-high-Q silica microsphere resonator with approximate diameter of 150 µm that is pumped by a 1550 nm tunable diode laser by means of a tapered optical fiber as shown in FIG. 2B. For technical convenience, a laser, e.g., an electro-optic modulator (EOM) is used to generate the probe signal at a fixed offset from the control laser (described below). A high-speed photodetector monitors the transmitted optical signals at the far end of the tapered fiber, and performs a heterodyned measurement of the probe signal response by means of the beat note between the probe laser and the fixed control laser. A network analyzer can be used to generate the EOM input signal (modulation frequency) for the probe laser offset, and to measure the magnitude and phase response of the probe. This can be carried out in a room temperature and atmospheric pressure environment.

In one example, a system of Brillouin phase-matched optical and acoustic modes is identified through forward-SBS lasing by pumping the higher frequency optical mode above the lasing threshold. The electronic signature of such phase matching is the generation of a single beat note at $\Omega_B$ at the output of the wide bandwidth photodetector, whose lack of harmonics rule out the known radiation pressure parametric instability as shown in FIG. 3C and FIG. 4C. When the control laser is parked at the lower optical resonance, it leads to destructive interference for a probe beam on the higher resonance and generates a transparency window (FIG. 3A and FIG. 3D). The measured amplitude response of the probe laser in FIG. 3D shows the relatively broad 4.4 MHz wide anti-Stokes optical mode with optical quality factor of $4.4 \times 10^7$. A very sharp transparency feature at 349.3 MHz offset from the control laser is observed in both amplitude and phase responses of the probe (FIG. 3D and e). This 349.3 MHz frequency corresponds to a whispering-gallery acoustic wave mode of the resonator with azimuthal mode number of 48 and phonon lifetime of 59.2 µs. The rapidly changing phase response feature with a positive slope corresponds to a very low group velocity for the optical probe e.g. "slow light". The group delay, $\Delta t$, can be determined using the relationship $\Delta t = d\phi/d\omega$. Positive $\Delta t$ represents an optical delay and a negative value represents an optical advancement. Here, 1 µW of control laser power is used to generate 110 µs time delay for the probe (FIG. 3F).

Figure 4A:
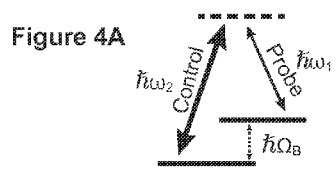
FIGS. 4A-F include graphs representing observation of Brillouin scattering induced opacity and fast light.
Figure 4B:
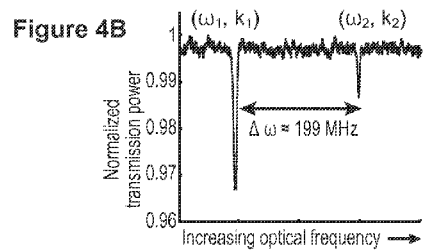
Figure 4C:
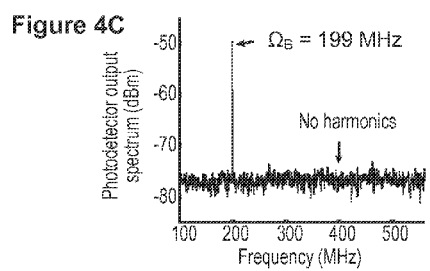
Figure 4D:
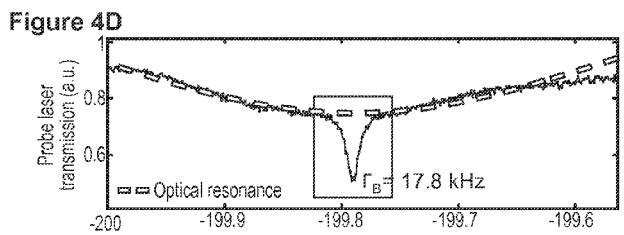
Figure 4E:
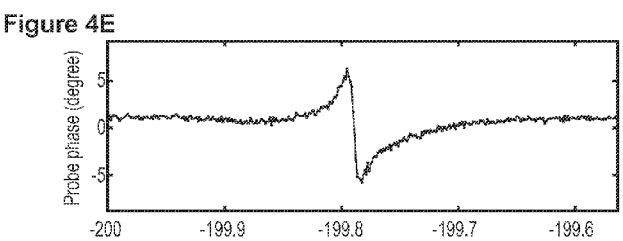
Figure 4F:
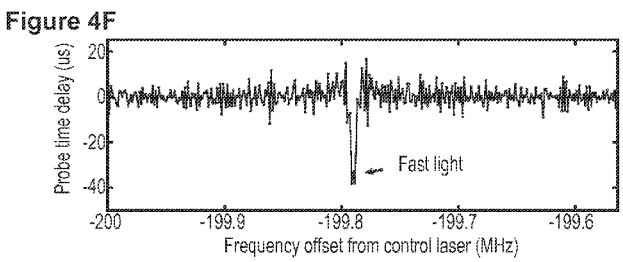

FIGS. 4A-F include graphs representing observation of Brillouin scattering induced opacity and fast light. Fast light can be used to improve a sensitivity of rotation sensors, etc. In FIG. 4A, the control laser pumps the ($\omega_2, k_2$) optical mode while the probe measures the lower frequency mode, ($\omega_1, k_1$). In FIG. 4B, the optical modes are mapped with a swept frequency laser. In FIG. 4C, when a laser pumps ($\omega_2, k_2$) above threshold (as in FIGS. 3A-F), forward-SBS lasing results. In FIG. 4D, the probe experiences an opacity at $\Omega_B$ offset from the control laser. (Solid) Amplitude response of the probe laser. (Red-dashed) Curve fit to the ($\omega_1, k_1$) optical mode. FIG. 4E. Negative slope in the probe phase corresponds to a fast light response within the opacity region. FIG. 4F. Probe time advancement compared to the transmission time without Brillouin scattering induced opacity. Time advancement of 35 µs is demonstrated using 380 µW of control laser power.

The observation of slow light with an anti-Stokes probe signal appears to stand in opposition to the SBS-induced fast light with the chosen pump-probe configuration. This is because the probe phase response in the example experiment is measured in the waveguide, whereas the SBS interaction takes place within the resonator. As detailed below, the probe phase response within the resonator precisely follows the expected fast light response from SBS systems. Since the waveguide transmission is a result of the interference of the exiting probe light from the resonator with the externally supplied probe signal, the measured response exhibits a slow light characteristic.

If the control optical signal is tuned to the higher energy optical resonance, it creates a region of greater opacity for a probe on the lower energy optical mode and a "fast light" dispersion feature (FIGS. 4A and 4D). Due to thermal effects on the optical resonance frequencies, it may be technically more convenient to demonstrate opacity and fast light with a different forward-SBS triplet on the same resonator where $\Omega_B$=199.8 MHz (phonon lifetime of about 56.2 μs). The amplitude response of the probe laser in FIG. 4D shows the 0.4 MHz wide Stokes optical mode with optical quality factor of about 4.9×10$^8$. An opacity with a 17.8 kHz linewidth is induced at 199.8 MHz offset from the pump. Again, based on the rapidly varying phase response with a negative slope, estimate additional 35 μs fast light time advancement using only 380 nW of control laser power (FIG. 4F).

For the induced absorption in BSIT (or OMIT) to occur, the driving or pump field leads to an amplification instead of damping of the mechanical mode. In this regard, induced absorption in BSIT is related to optical parametric amplification in a resonator (below the threshold). In this context, the induced absorption in BSIT (or OMIT) differs from the effect of Electromagnetically Induced Absorption (EIA) in atomic systems.

Figure 5:
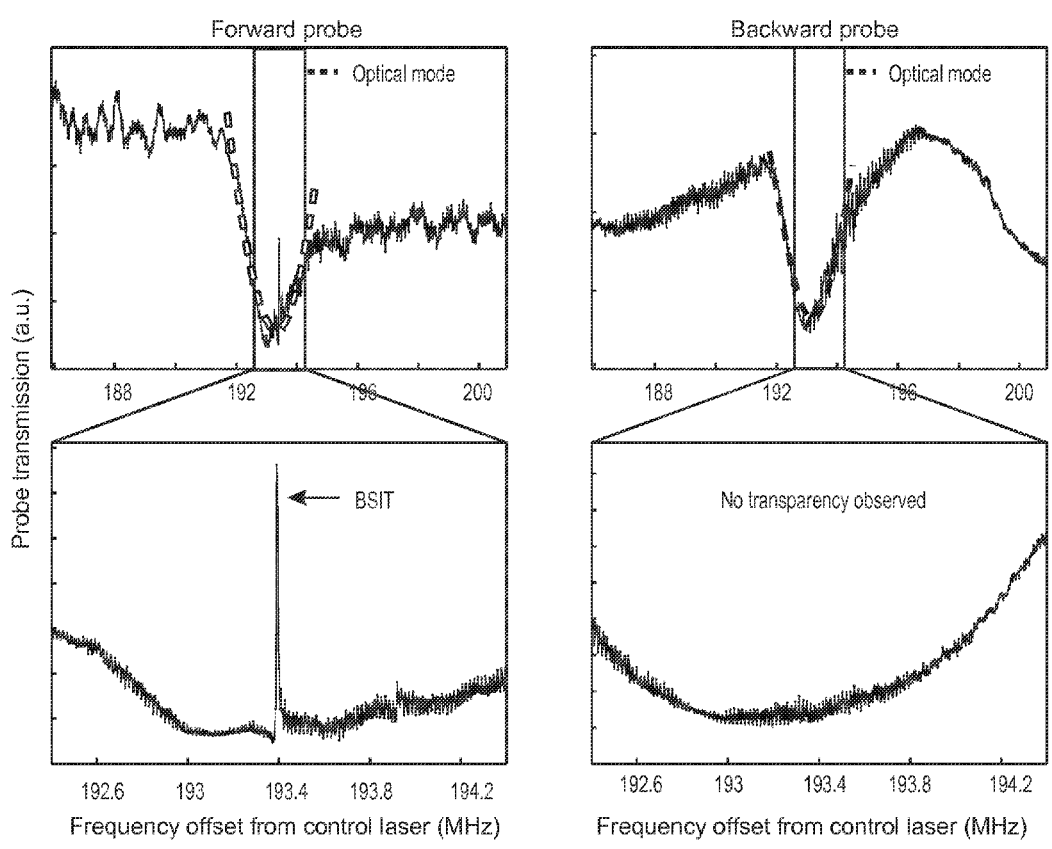
FIG. 5 includes graphs that demonstrate non-reciprocity in BSIT.

FIG. 5 includes graphs that demonstrate non-reciprocity in BSIT. On the left transparency is induced in the anti-Stokes optical mode for a forward propagating probe signal in a Brillouin coupled system. On the right there is no transparency observed when the optical probe signal is switched to the backward direction. The background noise and asymmetries are created due to the Fabry-Perot resonances in the differing forward and backward fiber propagation pathways, and the transfer functions of the two different electro-optic modulators used for the experiment.

An achievable time delay and bandwidth is described for slow light through BSIT. The acoustic dissipation rate $\Gamma_B$ is a primary determinant for the bandwidth over which BSIT occurs and where slow and fast light can be achieved. In the case of BSIT, $\Gamma_B$ can be increased or decreased through the control laser power as previously shown in the experiment on Brillouin cooling. In the case of BSIT, the relationship $\Gamma_B = \Gamma_i + (|\beta a_1|^2 \kappa)/(\kappa^2 + \delta^2)$ describes the relationship of the acoustic dissipation with respect to the control laser field $a_1$. Here, $\Gamma_i$ is the intrinsic dissipation rate for the unperturbed traveling-wave acoustic mode, while δ is the detuning of the transparency with respect to the anti-Stokes optical mode ($\delta = \omega_2 - \omega_1 - \Omega_B$ as described below). The time delay achievable in BSIT is expressed through the relation $\Delta t = 2/\Gamma_B$ derived as in other opto-acoustic transparency mechanisms. This expression underscores the delay vs bandwidth tradeoff that is made and that cannot be overcome in SBS or optomechanical systems.

A common figure-of-merit employed in SBS slow light systems is thus the delay-bandwidth product, since the penalty for long delay times is generally a significantly reduced bandwidth. In this regard, the delay-bandwidth product, 0.63 MHz-μs for fast light and 1.87 MHz-μs for slow light, is on par with previous SBS based demonstrations. A comparison using delay-bandwidth product, however, overlooks the space and power budgets required to generate the optical delay. One can account for the device footprint e.g. opto-acoustic path length (waveguide length in linear SBS systems, circumference in circular resonators) and the control power input to the device (waveguide or resonator) by normalizing the reported delay-bandwidth product against these two engineering parameters. In a resonator BSIT demonstration, the delay-bandwidth per-laser-power per-device-circumference is about 4.0×10$^6$ MHz-μs W$^{-1}$ m$^{-1}$, which is about 5 orders-of-magnitude higher than the next highest reported value in any SBS system (44 MHz-μs) This ultralow power and compact microresonator based slow light demonstration is thus adaptable for on chip Brillouin systems without needing lengthy waveguides or kilometers of fiber.

BSIT can require a special phase-matching requirement that is absent in other induced transparency mechanisms, including OMIT. In FIG. 2B, the forward-SBS phase matching requires co-propagating optical fields with an acoustic field traveling in the same direction. However, it can be seen that the momentum vector of the chosen acoustic mode does not allow coupling between the two optical fields when the probe field is traveling in the opposite direction.

The non-reciprocity intrinsic to BSIT in FIG. 5 may be validated. A BSIT system is prepared as described previously, the forward and backward directions in this system is optically probed through independent probes, for the same fixed control laser (see, e.g., FIG. 12B). Data presented in FIG. 5 shows the same anti-Stokes optical mode in both forward and backward directions, which can be validated by modifying the optical coupling, polarization, and laser detuning. While a narrowband BSIT is observed within the optical mode in the forward direction, it is entirely absent for a backward probe. This is the first demonstration where non-reciprocal transmission has been observed in an opto-mechanical system. BSIT thus offers a non-magnetic alternative to the Faraday effect based non-reciprocal devices in a small footprint that is appealing for on-chip applications, e.g., integrated circuit chip or integrated photonic chip.

Although phase matching may impose strict constraints on the optical signal frequencies in the BSIT process, the transparency can be tuned by either slightly modifying the pump frequency within its optical mode, or thermally tuning the optical modes themselves (FIG. 6). Furthermore, the transparency depth and width can be controlled through the control laser power represented as $|a_1|^2$ in equation 1. Such frequency tunability and the ability to switch the transparency on and off are desirable in several applications.

Figures 6A, 6B:
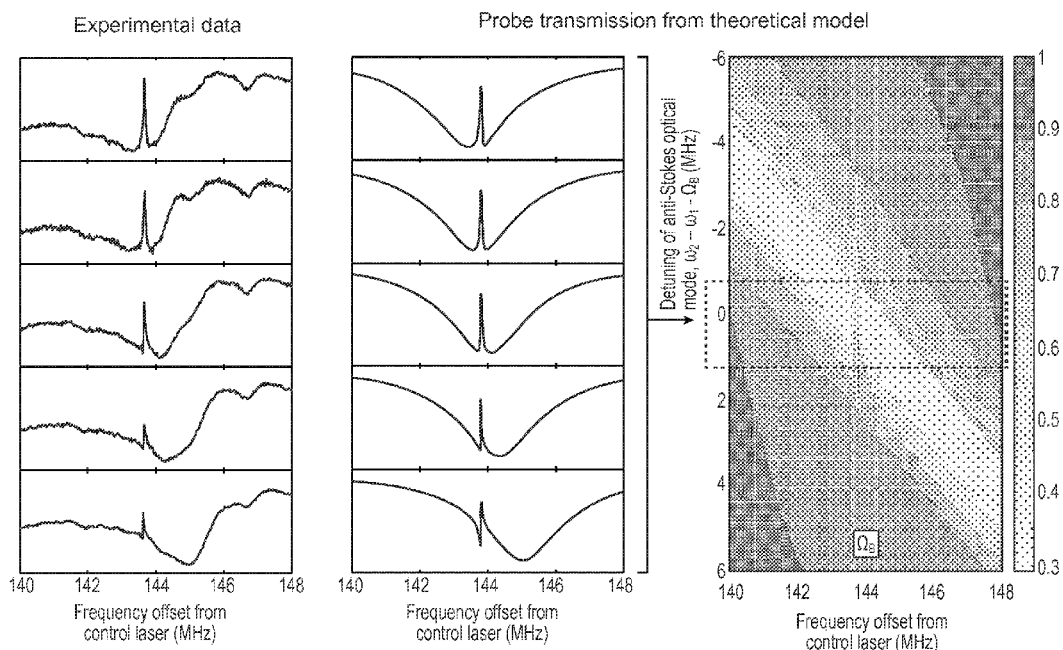
FIGS. 6A-B include graphs for tuning the frequency of the BSIT relative to the control laser frequency $\omega_c$.

FIGS. 6A-B include graphs for tuning the frequency of the BSIT relative to the control laser frequency $\omega_c$. In FIG. 6A, tuning the control laser frequency $\omega_c$ causes a relative detuning of the anti-Stokes optical mode while the transparency remains at a fixed frequency offset $\Omega_B$. In this example, a SBS triplet with $\Omega_B$=143.7 MHz is used. In FIG. 6B, theoretical modeling through equation 1 shows the stationary transparency at $\Omega_B$ while the anti-Stokes optical mode is tuned through the control laser frequency.

There is a difference between EIT processes in an atomic system and EIT-related processes involving a single mechanical oscillator. The latter, including OMIT and BSIT, is essentially a coupled oscillator phenomenon arising from the coherent coupling between the mechanical oscillator and an optical probe field (in the undepleted pump approximation). Spatially extended excitations similar to dark-state polaritons in atomic media cannot be formed in a single mechanical oscillator. A direct consequence of this is that only a single mode field can be stored in the mechanical oscillator. An array of oscillators is used for the storage of the spatial-temporal profile of the optical field. This is also similar to the pure optical analog of EIT processes.

Electrostrictive effects and Brillouin scattering are ubiquitous in all states of matter, including liquids, gases, and plasmas, implying that BSIT can be applied for optical switching in a broad range of platforms, including linear systems. In contrast to EIT-like phenomena including OMIT, BSIT requires a stringent momentum conservation, resulting in a demonstration that back-propagating probe signals do not experience the transparency. Such non-reciprocity can be exploited in magnet-free on-chip optical isolators, gyroscopes, and circulators. Moreover, while this demonstration is in a silica sphere, geometry engineering can be used to obtain enhanced SBS effects, much larger electrostriction coefficients can be obtained in chalcogenide glasses, and the sign of electrostrictive coupling can even be negative. Such flexibility can lead to new and surprising applications and engineered nonlinearities.

Figure 7:
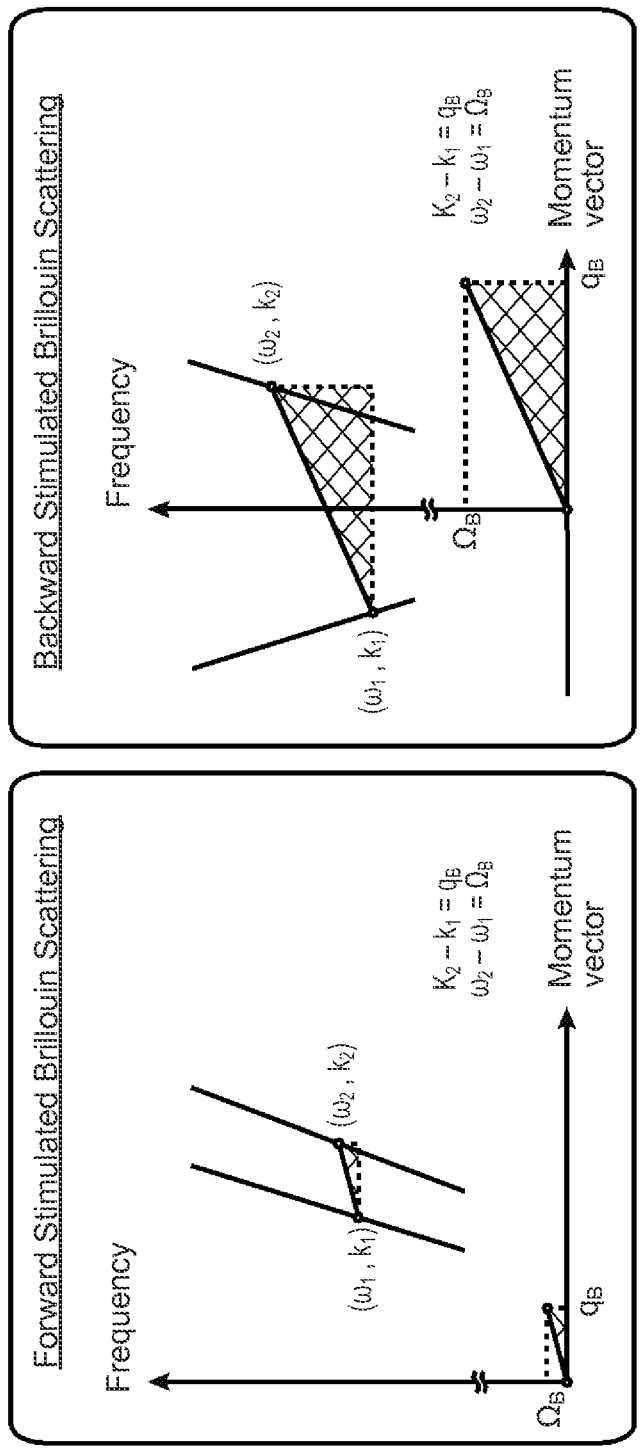
FIG. 7 includes graphs of a dispersion diagram and wave vector matching conditions for Brillouin scattering.

FIG. 7 includes graphs of a dispersion diagram and wave vector matching conditions for Brillouin scattering. When the control laser is parked at high frequency optical mode, $(\omega_2, k_2)$, Stokes scattered light is generated at low frequency optical mode, $(\omega_1, k_1)$. For Stokes scattering, the frequencies and wave vectors of the two optical modes and an intermediate acoustic mode satisfy the condition, $k_2 - k_1 = q_B$ and $\omega_2 - \omega_1 = \Omega_B$. The left graph illustrates a forward-SBS system, and the right graph illustrates a backward-SBS system.

Spontaneous Brillouin scattering occurs when light interacts with the refractive index perturbations in a material caused by the presence of an acoustic wave. The spatiotemporal beat of the incident and scattered light fields then create a periodic variation in refractive index through electrostriction pressure. In the case that light is scattered to lower frequencies (e.g. Stokes scattering), the electrostriction pressure imparts energy to the sound wave. On the other hand, for anti-Stokes scattering, energy is removed from the sound wave leading to cooling and linewidth broadening. When sufficient input laser power is provided, the Stokes scattering process can overcome all intrinsic losses, resulting in the formation of a Brillouin laser through Stimulated Brillouin Scattering (SBS).

In FIG. 7, for both forward scattering and back-scattering, specific energy conservation and momentum conservation (e.g. phase matching) requirements are satisfied for Brillouin scattering processes to take place. In a back-scattering SBS system, the optical fields propagate in opposite directions. Since the optical k-vectors are nearly identical, the acoustic momentum vector is about double the length of the optical such that $|q_B| = |k_1| + |k_2|$. This implies the generation of acoustic waves in the tens of GHz frequency regime, depending on the refractive index and speed of sound in the material. In a forward-SBS system, the frequencies of the incident and scattered light are nearly identical. Hence, the acoustic frequency is typically in a sub-GHz range and the phonon lifetimes are significantly longer. The lower frequency is also implied through the necessarily short acoustic momentum vector in the forward case.

FIG. 8 includes a graph of an optical frequency relationship of the coupled triplet system for transparency experiment using anti-Stokes scattering. The pump mode is at lower frequency than the anti-Stokes mode. When the modulation frequency sweeps over the fixed Brillouin phase match frequency, $\Omega_B$, the transparency is observed in the probe response.

For the analytical description of Brillouin scattering induced transparency (BSIT), the mathematical formalism established by Agarwal and Jha can be adopted. The intracavity fields representing the pump/control laser, anti-Stokes shifted probe, and acoustic displacement can be described using the following three coupled rate equations.

$$\dot{a}_1 = -\kappa_1 a_1 - i\Delta_1 a_1 - i\beta^* u^* a_2 e^{-i\delta t}$$

$$\dot{a}_2 = -\kappa_2 a_2 - i\Delta_2 a_2 - i\beta u a_1 e^{i\delta t}$$

$$\dot{u} = -\Gamma_B u - i\Delta_B u - i\beta^* a_1^* a_2 e^{-i\delta t} \quad (4)$$

$$\delta = \omega_2 - \omega_1 - \Omega_B$$

$$\Delta_1 = \omega_1 - \omega_c$$

$$\Delta_2 = \omega_2 - \omega_p$$

$$\Delta_B = \Omega_B - (\omega_p - \omega_c) \quad (5)$$

where $a_1$, $a_2$, and $u$ are the slowly varying phasor amplitudes of intracavity control field, scattered light field and mechanical displacement respectively, $\kappa_1$ and $\kappa_2$ are optical loss rates of pump mode and anti-Stokes mode respectively, $\Gamma_B$ is acoustic loss rate, and $\beta$ is the coupling coefficient accounting for modal overlap and Brillouin gain in the material. The frequencies $\omega_1$, $\omega_2$ and $\Omega_B$ represent the pump optical resonance, anti-Stokes optical resonance, Brillouin acoustic resonance, while $\omega_c$, and $\omega_p$ represent the control laser field and probe laser field respectively. $\delta$, $\Delta_1$, $\Delta_2$, and $\Delta_B$ are the detuning parameters.

Details on the evaluation of detuning parameters and the coupling parameter $\beta$ are provided in by Agarwal and Jha. For phase matching, the frequency relationship $\omega_2 = \omega_1 + \Omega_B$ are satisfied. Momentum matching is implicit in the complex phasors that represent the fields.

For the induced transparency experiment, the system can be analyzed at steady state, thus setting all derivatives to zero. Additional intracavity control field $f_c$ and probe field $f_p$ terms are added on the right-hand-side as shown in equation 6. For further simplification, assume that the optical loss rates $\kappa_1$ and $\kappa_2$ are nearly identical (new symbol $\kappa$). Finally, the non-depleted pump field approximation eliminates the coupling term from the first equation. Then obtain the simplified system:

$$0 = -\gamma_1 a_1 + f_c$$

$$0 = -\gamma_2 a_2 - i\beta u a_1 e^{i\delta t} + f_p$$

$$0 = -\gamma_B u - i\beta^* a_1^* a_2 e^{-i\delta t} \quad (6)$$

where $$\gamma_1 = \kappa + i\Delta_1$$

$$\gamma_2 = \kappa + i\Delta_2$$

$$\gamma_B = \Gamma_B + i\Delta_B \quad (7)$$

FIGS. 9A-B include graphs of theoretical prediction of amplitude and phase responses for induced transparency. FIG. 9A illustrates the probe field when measured inside the cavity. FIG. 9B illustrates the probe field transmitted and measured at the photodetector. The phase response of intracavity probe field is inverted as the light evanescently couples back to the waveguide and mix with the part of probe field that was reflected from the cavity.

Equation 6 can then be solved to produce the steady state amplitudes of the fields:

$$a_1 = \frac{f_c}{\gamma_1} \quad (8)$$

$$a_2 = \frac{f_p \gamma_B}{\gamma_2 \gamma_B + |\beta|^2 |a_1|^2} \quad (9)$$

$$u = \frac{-i\beta^* a_1^* a_2 e^{-i\delta t}}{\gamma_B} \quad (10)$$

The control laser (equation 8) excites the system, while the probe laser, described by equation 9, sweeps through the anti-Stokes optical mode of interest and experiences the induced transparency. The intracavity probe field transfer function is illustrated in FIG. 9A.

The phase response of the probe within the cavity is in agreement with the results from SBS demonstrations, e.g., an anti-Stokes probe experiences a fast light response. However, the opposite result (slow light) is observed when monitoring the probe field in the waveguide ($A_2 = RF_p + iTa_2$). Here, the input probe laser field is related to input intracavity field as $F_p = -if_p/T$, while R and T are the reflection and transmission coefficients at the coupler. As shown in FIG. 9B, observe a slow light behavior for the probe when measured in the waveguide.

Figure 10:
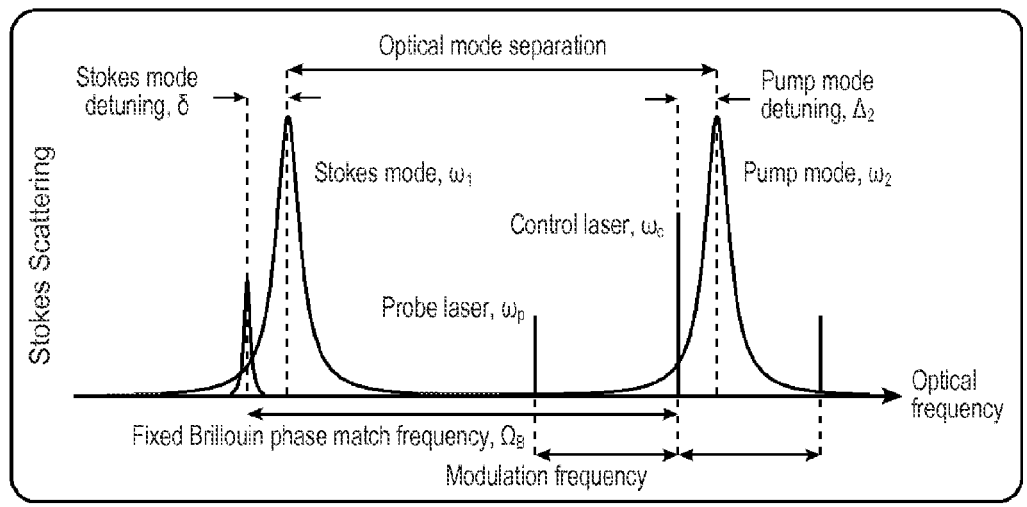
FIG. 10 is a graph of an optical frequency relationship of the coupled triplet system for absorption experiment using Stokes scattering.

FIG. 10 is a graph of an optical frequency relationship of the coupled triplet system for absorption experiment using Stokes scattering. Opposite to anti-Stokes scattering case, the role of the pump and scattered modes is switched. Also, the probe laser sweeps in the opposite direction from higher to lower frequency.

To understand Brillouin scattering induced absorption, the process is considered with a Stokes probe. Here, the same set of equations used for induced transparency can be employed (equation 4), except reverse the roles of the control and probe lasers. In other words, subscript 1 refers to the Stokes probe while subscript 2 refers to the control field. Then rewrite the simplified system equations as:

$$0 = -\gamma_1 a_1 - i\beta^* u^* a_2 e^{-i\delta t} + f_p$$

$$0 = -\gamma_2 a_2 + f_c$$

$$0 = -\gamma_B u - i\beta^* a_1^* a_2 e^{-i\delta t} \quad (11)$$

where $$\gamma_1 = \kappa + i\Delta_1$$

$$\gamma_2 = \kappa + i\Delta_2$$

$$\gamma_B = \Gamma_B + i\Delta_B \quad (12)$$

The frequency matching relationship between the fields is unchanged e.g. $\omega_2 = \omega_2 + \Omega_B$. However, as illustrated in FIG. 10, the detuning parameters are modified on account of the interchanged control and probe designations.

$$\Delta_1 = \omega_1 - \omega_p$$

$$\Delta_2 = \omega_2 - \omega_c$$

$$\Delta_B = \Omega_B - (\omega_c - \omega_p) \quad (13)$$

Upon solving equation 11, the intracavity probe field is described as $$a_1 = \frac{f_p \gamma_B^*}{\gamma_1 \gamma_B^* - |\beta|^2 |a_2|^2} \quad (14)$$

As before, the forward probe transmission in the waveguide $A_1$ is described as $$A_1 = RF_p + iTa_1. \quad (15)$$

Figures 11A, 11B:
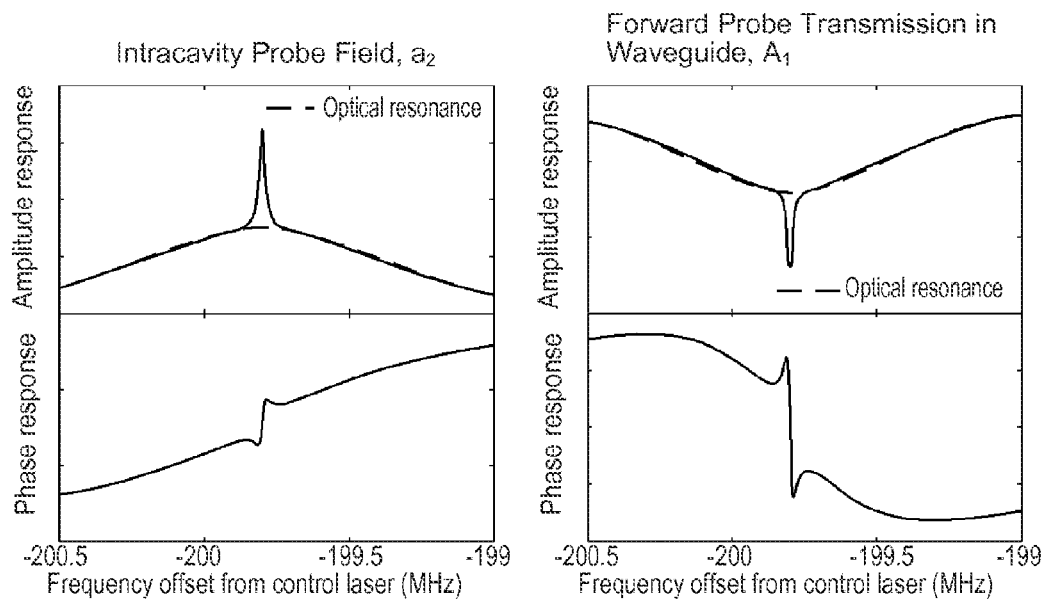
FIGS. 11A-B are theoretical prediction of amplitude and phase responses for induced absorption.

Note an inversion of phase response when the probe field exits the resonator and mixes with the reflected input probe that did not couple to the resonator (FIGS. 11A-B).

FIGS. 11aA-B are theoretical prediction of amplitude and phase responses for induced absorption. FIG. 11A illustrates a probe field when measured inside the cavity. FIG. 11B illustrates a probe field transmitted and measured at the photodetector. The phase response of intracavity probe field is inverted as the light evanescently couples back to the waveguide and mix with the part of probe field that was reflected from the cavity.

Figure 12A:
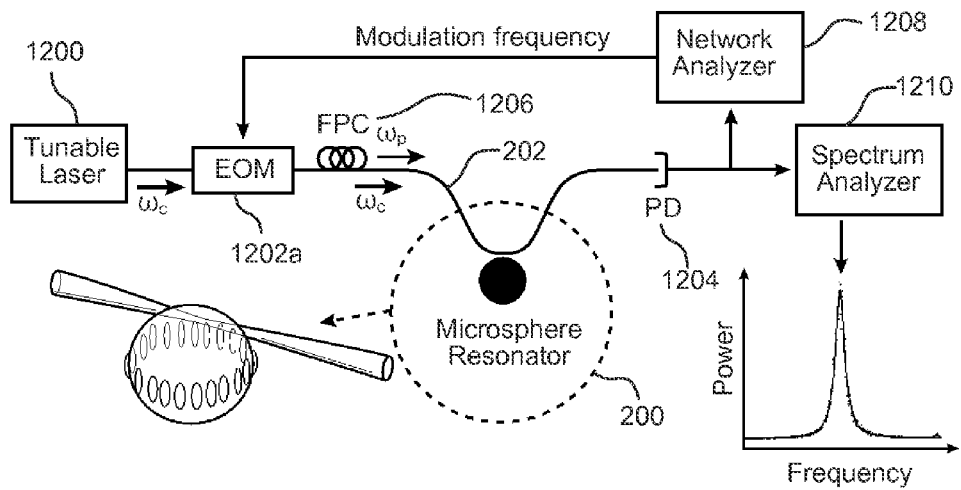
FIG. 12A is a block diagram of an example setup for BSIT.
Figure 12B:
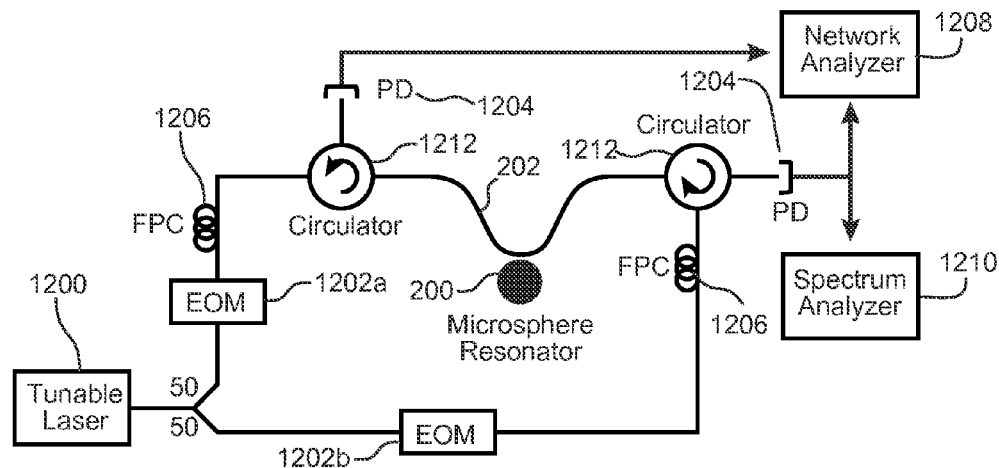
FIG. 12B is a block diagram of an example setup for non-reciprocity.

FIG. 12A is a block diagram of an example setup for BSIT, and FIG. 12B is a block diagram of an example setup for non-reciprocity. The fiber coupled tunable diode laser 1200 sends the control laser signal $\omega_c$ through a tapered waveguide. Network analyzer provides probe frequency to the electro-optic modulator (EOM) 1202a which creates a probe signal $\omega_p$ from the control laser 1200. In FIG. 12B, independent probe signals can be sent in the forward and backward directions by controlling the two EOMs 1202a, b. The FPC 1206 is fiber polarization controller used to adjust polarization of light within the optical fiber. Photodetector (PD) 1204 can be used to monitor the signal transmission at the waveguide output, and the electronic signals can be analyzed using a network analyzer 1208 and electrical spectrum analyzer 1210.

An ultra-high-Q silica microsphere resonator 200 is evanescently coupled to a tapered silica fiber waveguide 202 that provides coupling mechanism to the intracavity control and probe light fields. The tunable diode laser 1200, e.g., with a center wavelength of about 1550 nm, provides the control field to the pump mode, while the probe signal is generated using an EOM 1202a, b. While the EOM 1202a, b creates two probe sidebands relative to the control laser 1200, only one sideband is matched to the anti-Stokes optical mode of the device. The other Stokes sideband passes through the system unhindered at constant amplitude. The probe sideband spacing is determined by a modulation signal input to the EOM that is generated by a network analyzer. The transmitted optical signal at the output of the waveguide 202 is received by a high-speed photodetector 1204, which results in an electronic output beat note between the control $\omega_c$ and probe $\omega_p$ optical signals. The system can utilize circulators 1212 to control flow of the optical signals. The electronic output can be analyzed by an electrical spectrum analyzer 1210 as well as the network analyzer 1208 for probe transfer function analysis. When the higher energy optical mode is pumped above threshold (in the absence of a probe), the electronic beat note can be used to distinguish the Brillouin scattering from radiation pressure induced optomechanical oscillation.

The figure-of-merit reported in SBS slow and fast light systems is the product of group delay and bandwidth. Note, however, that both laser power and device size are engineering-related constraints that are budgeted wisely. This can be important in on-chip devices where the laser power budgets are extremely small and kilometer-long waveguides (as in fiber SBS systems) are impractical.

In order to make a comparison of the relative efficiency of the resonator 200 approach against various other SBS based systems, the achieved delay-bandwidth can be divided by the control laser power and device size through FoM=$\tau\Gamma_B/I_c L$, where $\tau$ is group delay, $\Gamma_B$ is bandwidth for the delay, $I_c$ is the input laser power, and L is opto-acoustic interaction length. In the case of linear waveguides, this length is the total waveguide length while in resonators it is fair to use the resonator circumference as a linear measure. Resonators 200 have the advantage of the high optical and acoustic finesse compared against linear systems.

Example data can be compared against previous SBS slow light reports in Table 1. It is seen that the resonator system provides a $\tau\Gamma_B$ product that is comparable to all previous demonstrations (order-of-magnitude is 1). In terms of the size and power FoM, however, the resonator system provides a $\tau\Gamma_B$ product with 5 orders-of-magnitude lower power×length product than the next nearest system. This engineering advantage can make the resonator system particularly well-suited for on-chip SBS slow light systems that are otherwise impractical.

Table 1 compares the figures-of-merit for various example SBS slow light systems. For each publication, only the results with highest figure of merit value reported are presented. The BSIT system has delay times bandwidth product ($\tau\Gamma_B$) that is on par with other SBS slow light systems. However, the power- and size-normalized delay× bandwidth shows that the resonator system can provide comparable $\tau\Gamma_B$ with $10^5$ times lower power and size when compared against the next nearest prior result.

| Author | Highest group delay, $\tau$ ($\mu$s) | Bandwidth, $\Gamma_B$ (MHz) | Control laser power, $I_c$ (mW) | Device length, L (km) | Delay × Bandwidth product, $\tau\Gamma_B$ ($\mu$s-MHz) | Power and size normalized Delay × Bandwidth, $\frac{\tau\Gamma_B}{I_c L}$ ($W^{-1}m^{-1}$) |
|---|---|---|---|---|---|---|
| BSIT (Slow light) | 110 | 0.017 | 1 | $4.7 \times 10^{-7}$ | 1.87 | $3.98 \times 10^6$ |
| R. Pant | 0.023 | 40 | 300 | $7 \times 10^{-5}$ | 0.92 | $4.38 \times 10^1$ |
| K. Y. Song | 0.018 | 13.33 | 0.012 | $6.7 \times 10^0$ | 0.24 | 2.99 |
| D. Deng | 0.37 | 1 | 1000 | $1 \times 10^{-2}$ | 0.37 | $3.69 \times 10^{-2}$ |
| H. Ju | 0.04 | 11.24 | 20 | $2 \times 10^0$ | 0.45 | $1.12 \times 10^{-2}$ |
| Y. Okawachi | 0.02 | 66.67 | 250 | $5 \times 10^{-1}$ | 0.4 | $1.07 \times 10^{-2}$ |
| Y. Ding | 0.024 | 50 | 16 | $5 \times 10^{-1}$ | 1.2 | $1.5 \times 10^{-3}$ |
| L. Yi | 0.0008 | 812.5 | 100 | $1.25 \times 10^1$ | 0.65 | $5.2 \times 10^{-4}$ |

Figure 13A:
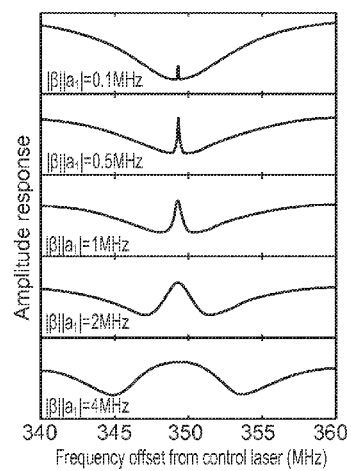
FIGS. 13A-C include graphs illustrating tuning transparency using control laser power.
Figure 13B:
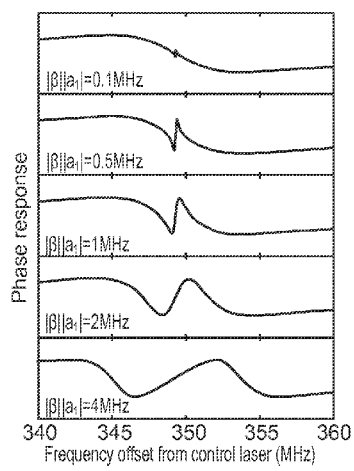
Figure 13C:
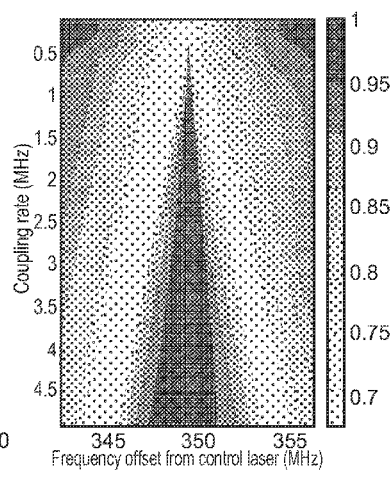

FIGS. 13A-C include graphs illustrating tuning transparency using control laser. In FIG. 13A, increasing the control laser power increases the coupling rate, $|\beta||a_1|$, and the coupling rate increases the amplitude of the transparency peak. Past the strong coupling regime, the mode splitting occurs. In FIG. 13B, the change in phase response with increasing control laser power. FIG. 13C illustrates a spectrogram of normalized amplitude response. Color bar on the right represents the absorbed optical power. The degree of mode split increases with increasing control laser power.

When the coupling rate is comparable to the optical loss rate $|\beta||a_1|\approx\kappa$, the system enters the strong coupling regime. In the strong coupling regime, a mode split is observed in which an optical resonance at the original frequency is completely removed. Instead, there are effectively two new optical resonances which can be tuned using the coupling rate. The coupling coefficient $\beta$ can be held constant while the control field $a_1$ is used to manipulate the coupling rate. In FIG. 13A, the progression of the mode split with increasing control laser power is shown. The strong coupling regime can be reached with about only 40 µW of dropped input optical power. Here, optical loss rate $\kappa$=4.4 MHz and acoustic loss rate $\Gamma_B$=16.9 kHz are extracted from the experimental data.

The systems, methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

Many modifications and other embodiments set forth herein can come to mind to one skilled in the art having the benefit of the teachings presented in the foregoing descriptions and the associated drawings. Although specified terms are employed herein, they are used in a generic and descriptive sense only and not for purposes of limitation.

The invention claimed is:

1. A system comprising:
   a resonator shaped to include two optical modes that are distinct in both frequency and momentum and an acoustic mode at a frequency and momentum matching a difference between the two optical modes;
   a control laser to create a control laser signal in one of the two optical modes of the resonator;
   a probe laser to create a probe laser signal in another of the two optical modes of the resonator;
   an optical coupler to provide an interface of the control laser signal and the probe laser signal with the two optical modes of the resonator; and
   where a coherent interaction between the two optical modes and the acoustic mode modifies an amplitude or a phase of light in the optical coupler depending on a direction of propagation of the control laser signal or the probe laser signal, or both the control laser signal and the probe laser signal.

2. The system of claim 1, where the resonator comprises a silica micro-resonator including a naturally occurring, forward-stimulated Brillouin scattering phase-matching modal configuration.

3. The system of claim 2, where the transparency is non-reciprocal.

4. The system of claim 1, where the transparency includes compact and ultralow power slow and fast light generation.

5. The system of claim 1, where the transparency comprises at least one of optical switching, optical isolator, optical circulators, and gyroscopes.

6. The system of claim 1, where the transparency does not employ an external magnetic field.

7. The system of claim 1, where the transparency is tuned using the control laser.

8. The system of claim 1, where the transparency comprises Brillouin scattering.

9. The system of claim 1, where a geometric shape of the resonator comprises at least one of a spheroid, a disk, a ring, a toroid, a shell and a balloon.

10. The system of claim 1, where the transparency is induced by anti-Stokes loss plus resonator loss.

11. The system of claim 1, where the control laser and the probe laser comprise a same laser.

12. The system of claim 1, where the coherent interaction between the two optical modes and the acoustic mode creates a transparency in one direction and maintains opacity in an opposite direction.

13. The system of claim 1, where the optical coupler comprises a waveguide.

14. A system comprising:
   a silica micro-resonator shaped to include two optical modes that are separated in both frequency and momentum and an acoustic mode at a frequency and momentum matching a difference between the two optical modes;
   the silica micro-resonator including a naturally occurring, forward-stimulated Brillouin scattering phase-matching modal configuration; and
   the silica micro-resonator configured to induce a Brillouin scattering induced transparency generated by an acousto-optic interaction of light with long-lived propagating phonons, the silica micro-resonator configured to provide phase-matching so that the Brillouin scattering induced transparency is non-reciprocal.

15. The system of claim 14, where the Brillouin scattering induced transparency includes compact and ultralow power slow and fast light generation.

16. The system of claim 14, where the Brillouin scattering induced transparency comprises at least one of optical switching, optical isolator, optical circulators, and gyroscopes.

17. The system of claim 14, where the Brillouin scattering induced transparency does not employ an external magnetic field.

18. The system of claim 14, where the Brillouin scattering induced transparency is tuned using a control laser.

19. The system of claim 14, where the acousto-optic interaction comprises a control laser signal, a probe laser signal and an acoustic signal.

20. The system of claim 19, where the acoustic signal provides a coherent interaction between the control laser signal and the probe laser signal.

* * * * *